United States Patent [19]

Tomioka et al.

[11] 4,366,279
[45] Dec. 28, 1982

[54] FLAME RETARDANT POLYCARBONATE RESIN COMPOSITION

[75] Inventors: Tatsuya Tomioka; Norio Ogata, both of Sodegaura, Japan

[73] Assignee: Idemitsu Kosan Company Limited, Tokyo, Japan

[21] Appl. No.: 294,400

[22] Filed: Aug. 19, 1981

[30] Foreign Application Priority Data

Sep. 11, 1980 [JP] Japan .................................. 55/126201

[51] Int. Cl.³ .......................... C08K 5/37; C08K 5/09; C08K 5/13
[52] U.S. Cl. ...................... 524/289; 524/240; 524/291; 524/341; 524/373; 524/417
[58] Field of Search ................. 260/45.85 B, 45.85 H, 260/45.85 A, 45.85 R, 45.7 P; 528/202, 203, 204, 486; 524/289, 291, 341, 373, 417

[56] References Cited

U.S. PATENT DOCUMENTS

| | | | |
|---|---|---|---|
| 3,201,369 | 8/1965 | Dell et al. | 260/45.7 P |
| 3,322,719 | 5/1967 | Peilstocker | 260/45.7 P |
| 3,635,895 | 1/1972 | Kramer | 528/202 |
| 3,668,181 | 6/1972 | Oxenrider | 528/486 |
| 3,951,903 | 4/1976 | Shaffer | 260/45.85 R |
| 4,097,457 | 6/1978 | Megumi et al. | 528/204 |
| 4,263,201 | 4/1981 | Mark et al. | 260/45.85 A |

*Primary Examiner*—V. P. Hoke
*Attorney, Agent, or Firm*—Frishauf, Holtz, Goodman & Woodward

[57] ABSTRACT

A flame retardant polycarbonate resin composition comprising a polycarbonate resin, a nuclear substituted benzoic acid containing at least one substituent selected from the group consisting of thiosalicylic acid and dihydroxy benzoic acid, and tetrabromobisphenol A or

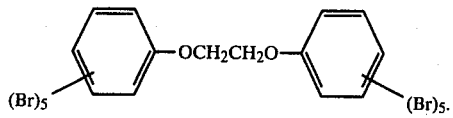

15 Claims, No Drawings

FLAME RETARDANT POLYCARBONATE RESIN COMPOSITION

BACKGROUND OF THE INVENTION

The present invention relates to a novel flame retardant polycarbonate resin composition and more particularly, to a flame retardant polycarbonate resin composition comprising a polycarbonate resin and a specific nuclear substituted benzoic acid.

Polycarbonate resin has superior mechanical properties and superior heat resistance. Polycarbonate is used in parts of machine as engineering plastic and also used in electric appliances and household furniture. Polycarbonate is flamable because it consists essentially of carbon and hydrogen as are other organic polymer.

In order to make polycarbonate resin flame retardant, flame retardants such as organohalides and phosphates have been incorporated, or in combination with such flame retardants, auxiliary flame retardants such as metal oxides, e.g., antimony trioxide, have been incorporated.

Recently, the standards for the safety of polycarbonate resin, such as the UL standards, have been increasingly tightened. Therefore, highly flame retardant polycarbonate resin has been strongly desired.

Such highly flame retardant polycarbonate resin can be prepared by adding a large amount of flame retardant. Addition of such a large amount of flame retardant, however, deteriorates the physical properties of the polycarbonate resin itself and furthermore, creates various problems resulting from the thermal decomposition of the flame retardant during melt-molding, such as discoloration of the polycarbonate resin, corrosion of molding machines due to the formation of harmful corrosive gases, and deterioration of the operation circumstances. Furthermore, problems such as reduction in the weather resistance of the molded product and formation of harmful gases during burning thereof, and the poisonous nature of the flame retardant itself, arise.

SUMMARY OF THE INVENTION

An object of this invention is to provide a flame retardant polycarbonate resin composition comprising a polycarbonate resin and a nuclear substituted benzoic acid.

It has been found that the object can be attained by employing a specific nuclear substituted benzoic acid as a flame retardant.

A nuclear substituted benzoic acid containing at least one substituent selected from the group consisting of a hydroxyl group, a mercapto group, an amino group and a formyl group is used.

DETAILED DESCRIPTION OF THE INVENTION

The flame retardant which is incorporated into a polycarbonate resin in the invention is a nuclear substituted benzoic acid containing at least one substituent selected from the group consisting of a hydroxyl group, a mercapto group, an amino group and a formyl group, which can be represented by the formula:

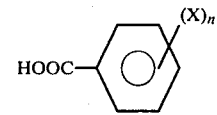

wherein X is a hydroxyl group (—OH), a mercapto group (—SH), an amino group (—NH$_2$), or a formyl group (—CHO), and n is an integer of 1 to 5. In nuclear substituted benzoic acids wherein two or more substituents (X) are linked to the benzene nucleus, each of the substituents may be the same or different.

Examples of such nuclear substituted benzoic acids include salicylic acid, thiosalicylic acid, dihydroxybenzoic acid, aminobenzoic acid, aminosalicylic acid, o-formylbenzoic acid, etc.

The amount of the nuclear substituted benzoic acid added is generally from 0.1 to 15 parts by weight, preferably from 0.5 to 5 parts by weight, per 100 parts by weight of the polycarbonate resin.

The polycarbonate resin as used herein is prepared by reacting a dihydric phenol and phosgene or dicarbonate. Preferred examples of dihydric phenol compounds are bisphenols, and in particular, 2,2-bis(4-hydroxyphenyl)propane (hereinafter referred to as "bisphenol A") is preferred. The whole or part of bisphenol A may be substituted by another dihydric phenol compound. Examples of dihydric phenol compounds other than bisphenol A include hydroquinone, 4,4'-dihydroxydiphenyl, bis(4-hydroxyphenyl)alkane, bis(4-hydroxyphenyl)cycloalkane, bis(4-hydroxyphenyl)oxide, bis(4-hydroxyphenyl)sulfide, bis(4-hydroxyphenyl)sulfoxide, bis(4-hydroxyphenyl)sulfone, and bis(4-hydroxyphenyl)ketone, and halogen-substituted compounds thereof. Homopolymers of these dihydric phenols, copolymers of two or more of the dihydric phenols, and blends thereof can be used.

The effects of the invention could be expected for thermoplastic resins other than the polycarbonate resin, such as polyolefin resins, e.g., polypropylene, polyethylene, an ethylene-propylene copolymer, etc; polystyrene; an AS resin; an ABS resin; polyesters, e.g., polyethylene terephthalate; polyamides, e.g., 6-nylon, 6,6-nylon, 6,12-nylon, etc.; an acrylic resin; and a polyvinyl chloride resin.

To the flame retardant polycarbonate resin composition of the invention, if necessary, organohalogen compounds can further be added as flame retardants. For this purpose, any organohalogen compounds having the flame retardant effect, such as aromatic, alicyclic and aliphatic compounds containing halogen atoms such as bromine, chlorine and fluorine, can be used.

Examples of such organohalogen compounds include hexabromobenzene, pentabromotoluene, brominated biphenyl, triphenyl chloride, brominated diphenyl ether, tetrachlorophthalic acid, tetrabromophthalic anhydride, tribromophenol, di-bromoalkyldiphenyl ether, tetrabromobisphenol S, tetrachlorobisphenol A, 2,2-bis(4-hydroxy-3,5-dibromophenyl)propane (hereinafter referred to as "tetrabromobisphenol A"), tetrabromobisphenol sulfone, tetrabromobisphenol ether, and aromatic halogen compounds represented by the following formulae:

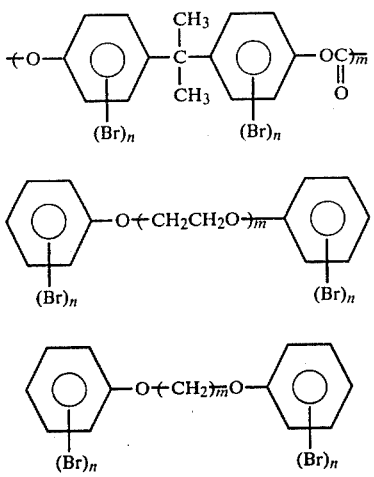

Examples of other organohalogen compounds which can be used as flame retardants include alicyclic halogen compounds such as monochloropentabromocyclohexane, hexabromocyclododecane, perchloropentacyclodecane, and hexachloroendomethylenetetrahydrophthalic anhydride, and aliphatic halogen compounds such as chlorinated paraffin, chlorinated polyethylene, tetrabromoethane, tetrabromobutane, tris(β-chloroethyl)phosphate, tris(dichloropropyl)phosphate, tris(dibromopropyl)phosphate, and tris(chlorobromopropyl)phosphate.

The amount of the organohalogen compound is generally from 0.1 to 40 parts by weight, preferably from 0.5 to 20 parts by weight, per 100 parts by weight of the polycarbonate resin although it varies depending on the type of the organohalogen compound.

The use of the organohalogen compound in combination with the nuclear substituted benzoic acid further increases the flame retardancy of the resultant polycarbonate resin composition. In addition, suitable amounts of other conventional flame retardants or auxiliary flame retardants can be added.

Such conventional flame retardants or auxiliary flame retardants include phosphorus-containing compounds. Of these phosphorus-containing compounds, metal salts of polyphosphoric acid are most preferred. Examples of such metal salts of polyphosphoric acid include various metal salts of condensed phosphoric acid such as a metal salt of pyrophosphoric acid, a metal salt of triphosphoric acid, a metal salt of trimethaphosphoric acid, and a metal salt of tetramethaphosphoric acid. Preferred examples of such metals include alkaline metals, alkaline earth metals, iron group metals, and manganese group metals.

The amount of the metal salt of polyphosphoric acid added is usually from 0.1 to 40 parts by weight, preferably from 0.5 to 20 parts by weight, per 100 parts by weight of the polycarbonate resin.

In addition, as auxiliary components, usual additives such as a reinforcing agent, a filler, a heat stabilizer, an ultraviolet absorbing agent, a plasticizer and a colorant can be added. The type and amount of the auxiliary component can be approximately determined depending on the type of the polycarbonate resin and the application for which the polycarbonate resin composition is used.

The specific nuclear substituted benzoic acid for use as a flame retardant increases markedly the flame retardency of the polycarbonate resin composition of the present invention. Furthermore, because of an excellent heat-stability of the nuclear substituted benzoic acid, the polycarbonate resin composition of the present invention is free from various problems resulting from thermal decomposition during molding, such as discoloration of the polycarbonate resin and deterioration of the operation circumstances, which arise in molding the conventional compositions in which a large amount of flame retardant is used. Moreover, when the organohalogen compound and other usual flame retardants are used in combination with the nuclear substituted benzoic acid, the amounts of such additives are significantly small as is not the case with the conventional compositions, and therefore, serious problems resulting from the use of such flame retardants do not arise.

The flame retardant polycarbonate resin composition of the present invention can be utilized for the production of electric devices, machines, office machines, cars, building materials, and so forth.

The invention is explained in detail by reference to the following examples.

EXAMPLES 1 TO 12

A series of polycarbonate resin compositions were prepared using 100 parts by weight of a powder of a polycarbonate resin (average molecular weight: 25,000) prepared from bisphenol A and flame retardant A, and if necessary flame retardant B and/or C in the amounts shown in Table 1. Each polycarbonate resin composition was melted and kneaded at a temperature of from 230° to 250° C. for 10 minutes in a laboplast mill, and was compression-molded at 230° to 250° C. to form a 3 millimeters (mm) thick sheet. A test piece (3 mm×6.5 mm×127 mm) was cut off from the sheet as formed above, and the oxygen index (OI) of the test piece was measured according to JIS K-7012. The results are shown in Table 1.

The symbols as used in the Table are as follows:
TBS: Tetrabromobisphenol A
Bromo compound:

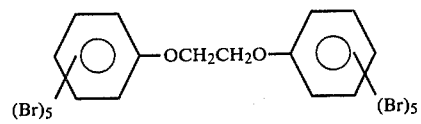

The term "oxygen index (OI)" as used herein is defined as the minimum percent of oxygen ($O_2$) in an oxygen-nitrogen gas mixture required for continuously burning a test piece. Higher values indicate higher flame retardency.

TABLE 1

| Example No. | Flame retardant A Kind | Flame retardant A Parts by weight | Flame retardant B Kind | Flame retardant B Parts by weight | Flame retardant C Kind | Flame retardant C Parts by weight | Oxygen Index (OI) |
|---|---|---|---|---|---|---|---|
| 1 | thiosalicylic acid | 1 | — | — | — | — | 30.5 |

TABLE 1-continued

| Example No. | Flame retardant A Kind | Parts by weight | Flame retardant B Kind | Parts by weight | Flame retardant C Kind | Parts by weight | Oxygen Index (OI) |
|---|---|---|---|---|---|---|---|
| 2 | thiosalicylic acid | 2 | — | — | — | — | 31.0 |
| 3 | thiosalicylic acid | 3 | — | — | — | — | 31.5 |
| 4 | dihydroxy-benzoic acid | 1 | — | — | — | — | 30.0 |
| 5 | aminobenzoic acid | 1 | — | — | — | — | 29.5 |
| 6 | p-amino salicylic acid | 1 | — | — | — | — | 29.5 |
| 7 | salicylic acid | 1 | — | — | — | — | 29.0 |
| 8 | o-formyl benzoic acid | 1 | — | — | — | — | 29.0 |
| 9 | thiosalicylic acid | 1 | TBS | 1 | — | — | 33.0 |
| 10 | thiosalicylic acid | 1 | bromo compound | 1 | — | — | 33.5 |
| 11 | thiosalicylic acid | 1 | TBS | 1 | $Na_4P_2O_7 \cdot 10H_2O$ | 1 | 38.5 |
| 12 | dihydroxy benzoic acid | 1 | TBS | 1 | " | 1 | 38.5 |

Comparative Examples 1 to 9

The procedure of Example 1 was repeated with the exception that another substance was used in place of flame retardant A. The results are shown in Table 2.

TABLE 2

| Comparative Example No. | Flame retardant Kind | Parts by weight | Oxygen Index (OI) |
|---|---|---|---|
| 1 | — | — | 27.5 |
| 2 | TBS | 1 | 29.5 |
| 3 | TBS | 2 | 30.5 |
| 4 | bisphenol A | 1 | 27.0 |
| 5 | thiobis-phenol A | 1 | 28.0 |
| 6 | terephthalic acid | 1 | 27.0 |
| 7 | p-amino phenol | 1 | 28.0 |
| 8 | glycine | 1 | 28.0 |
| 9 | sulfanilic acid | 1 | 27.0 |

What is claimed is:

1. A flame retardant polycarbonate resin composition comprising a polycarbonate resin which is prepared by reacting a dihydric phenol and phosgene or dicarbonate, a nuclear substituted benzoic acid selected from the group consisting of thiosalicylic acid and dihydroxybenzoic acid and an organohalogen compound selected from the group consisting of tetrabromobisphenol A and a compound having the formula

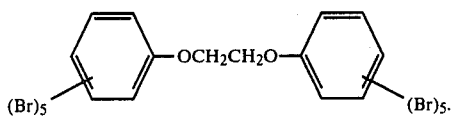

2. The composition of claim 1, containing said nuclear substituted benzoic acid in an amount from 0.1 to 15 parts by weight per 100 parts by weight of said polycarbonate resin, and said organohalogen compound in an amount from 0.1 to 40 parts by weight per 100 parts by weight of said polycarbonate resin.

3. The composition of claim 2, wherein said nuclear substituted benzoic acid is thiosalicylic acid.

4. The composition of claim 2, wherein said nuclear substituted benzoic acid is dihydroxybenzoic acid.

5. The composition of claim 2, wherein said nuclear organohalogen compound is tetrabromobisphenol A.

6. The composition of claim 3, wherein said organohalogen compound is tetrabromobisphenol A.

7. The composition of claim 4, wherein said organohalogen compound is tetrabromobisphenol A.

8. The composition of claim 1 or 2, wherein said organohalogen compound is

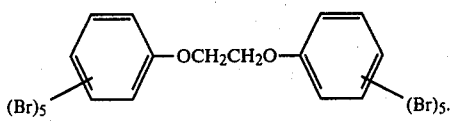

9. The composition of claim 3, wherein said organohalogen compound is

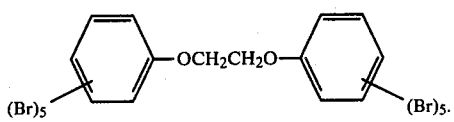

10. The composition of claim 4, wherein said organohalogen compound is

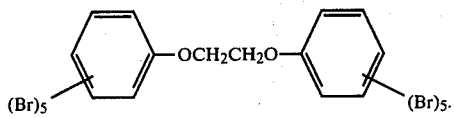

11. The composition of any one of claims 1, 6, 7, 9 or 10 containing said nuclear substituted benzoic acid in an amount from 0.5 to 5 parts and said organohalogen compound in an amount from 0.5 to 20 parts.

12. The composition of claim 8 containing said nuclear substituted benzoic acid in an amount from 0.5 to 5 parts and said organohalogen compound in an amount from 0.5 to 20 parts.

13. The composition of claim 1 or 2, which further contains a metal salt of a polyphosphoric acid.

14. The composition of any one of claims 1, 6, 7, 9 or 10, which further contains sodium pyrophosphate.

15. The composition of claim 11, which further contains sodium pyrophosphate.

* * * * *